Inventor
PETER L. CULLIMORE
BY
Tweedale & Gerhardt
Attorneys

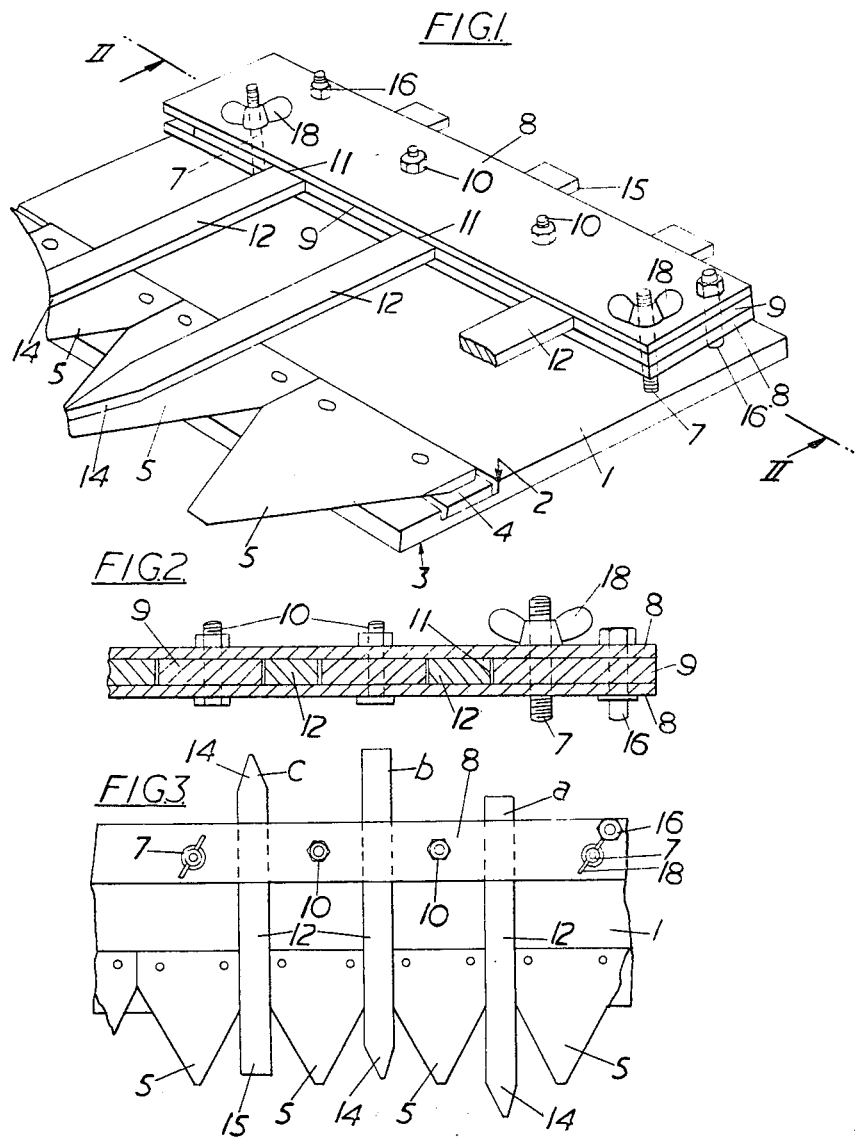

United States Patent Office 3,490,214
Patented Jan. 20, 1970

3,490,214
MECHANISM FOR CUTTING CROPS
OR LIKE GROWTH
Peter L. Cullimore, Lower Stone Farm, Berkeley,
Gloucestershire, England
Filed Mar. 8, 1966, Ser. No. 532,621
Int. Cl. A01d 55/02
U.S. Cl. 56—298                                    6 Claims

ABSTRACT OF THE DISCLOSURE

An agricultural cutting mechanism comprising a cutter support bar with guide means, a set of reciprocable knife blade elements, and a set of resilient static fingers mounted on the cutter support bar to exert a pressure on the abutting slidable surfaces of the knife blade elements. Cutting is performed between the edges of the knife blades and the resilient fingers on reciprocation of the knife blades.

---

This invention relates to mechanism for cutting crops or like growth, hereinafter referred to as "agricultural cutting mechanism."

Agricultural mowing, hedge-cutting or corn-cutting mechanisms consist of a cutter support bar provided with a forward guide means where a bar, on which are mounted many individual knife elements, is driven to reciprocate.

This invention is not concerned with cutters of the type where two reciprocating sets of blades slide one above the other, acting in opposition.

Conventional cutter bars are normally provided with a reciprocating knife including a series of blades which slide through slots in fingers rigidly attached to the cutter support bar. Cutting is performed by a shearing action between the blades and fixed ledger plates attached to the undersides of the slots in the fingers.

Furthermore, the knife must be supported on the cutter support bar, at its rear and usually against a wear plate, and the blades held down against the ledger plates by knife clips. For correct cutting action it is important that the knife blades be in close contact with all of the fingers and to ensure this it is necessary to set the fingers in alignment, and set the knife clips to position the blades correctly. No simple way of ensuring that these settings are correct is known and the usual method of setting the cutter bar correctly is to bend the fingers and the clips by use of a hammer. This however, is not very satisfactory, especially since often when in use the various parts rapidly become slightly out of adjustment, and the cutter assembly must be reset at relatively frequent intervals.

It is an object of the invention to provide a cutting mechanism in which the above disadvantages are obviated or mitigated.

According to this invention I provide an agricultural cutting mechanism comprising a set of static elements and a set of reciprocable elements, a cutter support bar being provided with a guide means on which a bar bearing one of said sets of elements is driven to reciprocate, and the elements of the other of said sets each providing a static pressure surface are adjustably mounted on the cutter support bar, the mounting being such as to urge the sets of elements together to exert a pressure on a plane surface of the elements, cutting being performed between edges of elements, one from each set, on reciprocation of the bar. The reciprocable elements may be knife blade elements and the static elements may comprise fingers.

In a preferred embodiment of the invention, the sets of elements are resiliently urged towards each other as a result of a spring action of the material of the static members.

Particular embodiments of the invention will now be described with reference to the accompanying drawing, wherein:

FIG. 1 is a perspective and sectional view of a portion of the mechanism.

FIG. 2 is a front sectional view of a portion of the mounting assembly taken along lines V—V of FIGURE 1.

FIG. 3 is a diagrammatic plan view of a portion of the mechanism.

Figure 4:
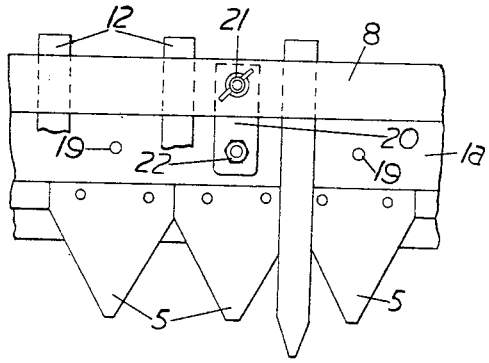
FIG. 4 is a diagrammatic plan view showing a modified method of attachment of the mounting assembly.

Referring to the drawing in FIG. 1 a cutter support bar 1 has a channel 2 and a front portion 3. A reciprocable bar 4 is positioned in the channel 2 which constitutes a guide means and has bolted or screwed to it a set of knife blade or reciprocable elements 5, each having the forward edges of their lower planar surface bevelled so as to give sharp edges. At one end of the bar 4 a linkage (not shown) imparts reciprocating motion to it. During this motion the bar 4 bears on the surface of the bottom of the channel 2 and the knives bear on the surface of the portion 3.

At the rear of the cutter support bar an assembly is provided secured by bolts 7 mounted through holes in the cutter-bar. The assembly consists of parallel metal strips 8 (FIGURE 2) separated by spacers 9 and secured together by nuts and bolts 10 passing through the spacers. The edges of the spacers and the inner surfaces of the strips thus secured define open-ended slots 11 in which fingers or static elements 12 may be positioned. These fingers are formed of spring steel and have a pointed sharp end 14 and a square or blunt end 15. They are of uniform cross section along the whole of their length (excluding the tip portions) and the slots 11 are by virtue of the thickness of the spacers of such dimensions that this cross-section forms a sliding fit in the slots 11 when the nuts and bolts 10 are not tightened, but is securely clamped when they are tightened. Every third or fourth spacer is modified to provide two extra holes, one for a bolt 7 and one for a bolt-headed flanged stud 16. When a nut is tightened on the bolt portion of 16 the effect is as that of nuts and bolts 10 on the single-holed spacers. There are a set of fingers 12, one to each blade element 5.

The bolts 7 are passed through the holes in the cutter support bar and in the mounting bar and wing-nuts 18 are screwed down to bear on the upper plate 8: a friction washer (not shown) has been previously placed on the bolt 7 between 8 and 18, and when 18 is tightened holds it against loosening by vibration. As 18 is tightened this and the stud 16, bearing on the surface of the cutter-bar at a point further from the blades than is the bolt 7, cause a moment to be applied to the strips 8, and the fingers or members 12 clamped between them are forced down on to the plane of the upper surface of the blades 5, therefore as the blade is driven back and forth under the finger the static lower surface of the finger exerts a pressure on the plane face of the blade and the lower corners of the finger mesh against the sharp edge of the blade to give a cutting action. The corners of the fingers may themselves be bevelled in a similar manner to the knife blades to improve the cutting action. The arrangement of the fingers is such that when being assembled, and with the blade in mid stroke they press first against the tip portion of their respective element, and on subsequent tightening of the nuts 18, the finegrs bend slightly to lie flush against the planar blade element surface. The spring nature of the finger allows the absorption of any irregularities in the blades while maintaining close contact with them. It is seen that the fingers are the only means of retaining the bar 4 and its associted blade elements in the channel 2 (as far as upward movement is concerned) so removal of the mounting assembly after screwing the wing nuts 18 off the bolts 7 allows ready access to the blade portions for maintenance or renewal.

It is possible to assemble the knife-blade elements on the reciprocable bar with a bevelled edge to their upper planar surface against which the fingers press. In this case the resiliency of the material of the finger would cause it to maintain contact with the cutting edge and ride slightly upwardly as the point of contact between that edge and the finger moves from the rear end of the blade towards its tip during reciprocating movement of the blade.

Whether the blade is mounted with its bevelled edge upper or lower, the pressure of the fingers on the blades provides a self sharpening action for the blades at least when the machine is idling. The pressure exerted on the blades by the fingers can be varied according to requirement by adjustment of the wing nut 18.

A further facility offered by the present embodiment is that of adjusting the length and shape of finger at the cutting portion.

At $a$ in FIG. 3 is seen a finger clamped so as to protrude in front of the leading portion of knife blade: this arrangement may be valuable in cutting crops which are in good condition. At $b$ the finger is seen clamped so as to have its point behind the line of the leading portions of blade: this may be valuable for cutting tangled crops. At $c$ the finger has been inserted in the gap 11 the other way round and the blunt end is now in front of the pointed end: a blunt ended comb such as this provides may be valuable in cutting tangled or coarse crops or growth.

Of course, in use, all fingers in an assembly would be set uniformly with regard to their position in front of or behind the leading portion of the blades. Since the fingers are of uniform cross-section any reasonable position may be adopted according to the needs of the moment.

With a slight modification, shown in FIG. 4, the mounting assembly may be attached to existing cutter support bars. These generally have an array of holes in positions such as 19, for the direct securing of fingers to the cutter support bar 1a. Bolts 7 and nuts 18 are omitted from the mounting assembly as previously described but a strap 20 of steel is secured to the under surface of the lower strip 8 by bolt and wing nut 21, and to the upper surface of the cutter bar by a nut and bolt 22. The turning moment is now exerted between the studs 16 and the strap 20 and the adjustment of pressure is able to be made by tightening or loosening the wing-nut 21 on its bolt.

Figure 5:
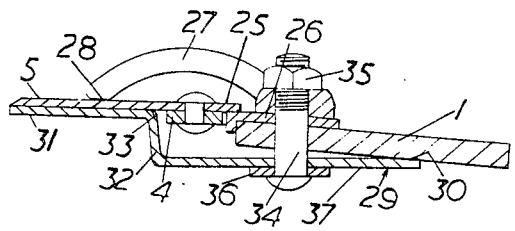
FIG. 5 is a section through a second embodiment along lines II—II of FIGURE 6.
Figure 6:
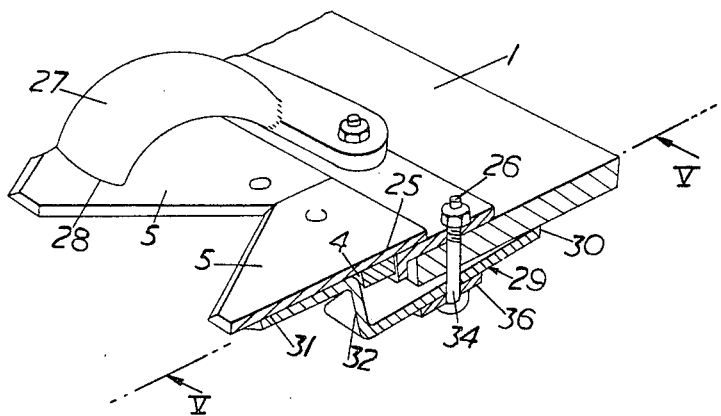
FIG. 6 is a perspective and sectional view of the embodiment shown in FIG. 5.

In the embodiment shown in FIGS. 5 and 6 the cutter support bar 1 does not extend under and support the bar 4. Reciprocable blade elements 5 secured to the reciprocable bar 4 extend slightly beyond it, at 25, to provide a ledge to co-operate with a guide and supporting means, a wear plate 26 on the bar 1 for the positioning of the rear end of the knife assembly.

A knife clip 27 is fixedly attached by one end to the bar 1 opposite, preferably, each third blade element 5. The clip extends arcuately forward and has at its end portion distant from the bar 1 a planar surface 28, to bear against the upper planar surface of the respective blade elements 5 and resist upward pressure from them.

The cutter support bar 1 is provided with a set of static elements, fingers 29, one to each of the blade elements 5. The fingers 29 are of resilient material such as spring steel, and are mounted below the cutter bar. Each finger 29 includes a rear root portion 37, a center cranked portion 32 and a front portion 31. A bolt 34 passes through the root portion 37 of the finger, the cutter support bar 1, and the wear plate 26 to locate the finger in a position such that the cranked portion 32 is close to the bar 4 to form an abutment and prevent forward movement of the knife.

Also, the depth of the cranked portion 32 is such that the rear end of the finger rests against the underside of the cutter bar at 30 and gradually diverges therefrom so that when the nut 35 is tightened on the bolt 34 the front portion 31 of the finger bears against the knife blade, exerting pressure on its planar surface.

Tightening or loosening of a self locking nut 35 on the bolt 34 increases or decreases pressure exerted, by virtue of the springiness of the material of the individual member 29, on the blade elements, between surfaces 31 and 28 or on blades retained against upward movement only by bar 4. To assist in exerting upward pressure, a coil spring may be borne on the bolt 34 between the nut 35 and support 26. The blades are arranged to extend at a slight downward angle to the plane of the cutter support bar 1.

It is essential that the fingers or members providing static pressure surfaces shall be completely restrained from any lateral movement. If any such movement is allowed it will rapidly build up, under the influence of the reciprocating blades, to such as extent as to render the arrangement inefficient. In the first embodiment, this clamping was effected by the strips 8 and spacer 9. In the second embodiment it is necessary either to secure the members 29 together in pairs by a rigid bar 36 welded to them and extending between the area of the apertures in the members, or between the extreme rear ends of the members (in which case the bar acts as the fulcrum point for the members).

An advantage which is found with the second embodiment described is that the effective cutting edge of the knife blades is the whole cutting edge of the knife blades. Another advantage which is found with the second embodiment is that this arrangement is readily applicable to existing cutter support bars, since fingers previously fitted to the bar may be replaced by fingers arranged as described.

It is advantageous that the members 29 described in the second embodiment shall be for the most part of their length parallel sided strips which taper to a point at their front ends 31 over a length which is the same as that for which they are in contact with the blade elements 5.

It is apparent that members of neither set of elements need be sharpened at their edge, when the cutting action would be by a shear action on the crops encountered by the elements, or that the reciprocating elements may have blunt or square edges and the static elements may have sharpened or bevelled edges, that is, the blade elements are the static elements.

The fingers may be of spring steel and have a hardened steel cutting and pressing face.

It will be readily understood that due to the provision of the fingers of the invention a cutter support bar is provided in which it is not necessary to exactly align the fingers since, due to their resilient action, they always tend to contact the knife blades. The laborious setting up procedure indicated before is therefore eliminated. Furthermore, in the case of the example shown in FIGURES 5 and 6 correct setting of the knife clips is not important as formerly since the resilient action of the fingers will accommodate small inaccuracies.

I claim:

1. An agricultural cutting mechanism comprising a cutter support bar, a knife including a plurality of cutting elements reciprocable along the bar, a pair of parallel plates which form a pair of parallel surfaces attached to the cutter support bar, a plurality of static cutting elements clamped between said pair of parallel surfaces at their rear portions and having free forward ends and being resiliently urged into contact with the reciprocable elements, and spacers clamped between said pair of parallel surfaces and adjacent to the static cutting element to maintain the static cutting elements in alignment.

2. An agricultural cutting mechanism comprising a cutter support bar adapted to extend transversely to the direction of travel when in work and supporting a knife including a plurality of laterally spaced-apart knife-edged cutting elements reciprocable along the bar, a pair of parallel plates attached to said cutter support bar, a plurality of laterally spaced-apart static cutting elements with their rear portions clamped between the pair of parallel plates and having free forward ends which are resiliently urged into contact with the reciprocable elements, means to adjust the pressure which said static cutting elements exert on said knife-edge cutting elements, and spacers clamped between said parallel plates and between adjacent static cutting elements to maintain the static cutting elements in alignment.

3. An agricultural cutting mechanism according to claim 2 wherein the reciprocable elements are triangular knife blade elements and the static elements are blunt-edged resilient fingers.

4. An agricultural cutting mechanism according to claim 2 wherein the assembly formed by members providing the pair of parallel plates, the spacers, and the static elements is adjustable as regards the angle at which it is inclined to the plane of the cutter support bar.

5. An agricultural cutting mechanism comprising a cutter support bar adapted to extend transversely to the direction of travel when in work and supporting firstly a knife including a plurality of laterally spaced-apart knife-edged cutting elements reciprocable along the bar and secondly a plurality of laterally spaced-apart static cutting elements resiliently urged into contact with the reciprocable elements to exert pressure on them by means adjustable to vary that pressure, for cutting to be performed by shearing between lateral edges of the elements, and wherein the static elements are mounted to be adjustable also in regards to the distance by which they extend from their mounting means.

6. An agricultural cutting mechanism according to claim 2 wherein pressure is resiliently exerted by the static elements on the reciprocable elements as a result solely of a spring action of the material of which the static elements are formed, said elements being held, to exert such pressure by said pair of parallel plates and said spacers.

References Cited

UNITED STATES PATENTS

| | | | |
|---|---|---|---|
| 1,085,349 | 1/1914 | Likely | 56—298 |
| 2,173,687 | 9/1939 | Johnson | 56—298 |
| 2,234,783 | 3/1941 | Snow | 56—307 |
| 2,246,943 | 6/1941 | Jones | 56—309 |
| 3,314,222 | 4/1967 | Scarnato et al. | 56—305 |

F. BARRY SHAY, Primary Examiner

PASQUALE A. RAZZANO, Assistant Examiner